US010623411B2

(12) United States Patent
Maruyama et al.

(10) Patent No.: US 10,623,411 B2
(45) Date of Patent: Apr. 14, 2020

(54) INFORMATION PROCESSING DEVICE, INFORMATION PROCESSING METHOD, AND MAPPING SERVER

(71) Applicant: SONY CORPORATION, Tokyo (JP)

(72) Inventors: Shinya Maruyama, Kanagawa (JP); Yuichi Kageyama, Tokyo (JP); Atsushi Onoe, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 20 days.

(21) Appl. No.: 15/751,201

(22) PCT Filed: Jun. 9, 2016

(86) PCT No.: PCT/JP2016/067272
§ 371 (c)(1),
(2) Date: Feb. 8, 2018

(87) PCT Pub. No.: WO2017/047172
PCT Pub. Date: Mar. 23, 2017

(65) Prior Publication Data
US 2018/0227301 A1 Aug. 9, 2018

(30) Foreign Application Priority Data

Sep. 17, 2015 (JP) .................. 2015-184163

(51) Int. Cl.
*G06F 21/62* (2013.01)
*H04L 29/06* (2006.01)
*G06Q 30/02* (2012.01)

(52) U.S. Cl.
CPC .......... *H04L 63/10* (2013.01); *G06F 21/6254* (2013.01); *H04L 63/08* (2013.01);
(Continued)

(58) Field of Classification Search
CPC .................................................. G06F 21/6254
See application file for complete search history.

(56) References Cited

U.S. PATENT DOCUMENTS 6,985,953 B1 * 1/2006 Sandhu ................... G06F 21/31
709/229
8,868,654 B2 * 10/2014 Guha ..................... G06Q 30/08
709/204

(Continued)

FOREIGN PATENT DOCUMENTS

CN 1497427 A 5/2004
JP 2004-145483 A 5/2004

(Continued)

OTHER PUBLICATIONS

International Search Report and Written Opinion of PCT Application No. PCT/JP2016/067272, dated Aug. 23, 2016, 09 pages.

*Primary Examiner* — Thaddeus J Plecha
(74) *Attorney, Agent, or Firm* — Chip Law Group

(57) ABSTRACT

[Object] To improve the convenience of a service using anonymous information.
[Solution] Provided is an information processing device including: a real name information acquisition unit configured to acquire real name information from a real name server that stores a user ID and personal information in association with the real name information; an anonymous information acquisition unit configured to acquire anonymous information from an anonymous server that stores an anonymous ID in association with the anonymous information; and a screen generation unit configured to generate a display screen including the real name information and the anonymous information.

10 Claims, 12 Drawing Sheets

(52) U.S. Cl.
CPC ...... *H04L 63/0853* (2013.01); *H04L 63/0884* (2013.01); *H04L 63/102* (2013.01); *G06Q 30/02* (2013.01)

(56) References Cited

U.S. PATENT DOCUMENTS

| | | | |
|---|---|---|---|
| 2004/0133547 | A1 | 7/2004 | Doi |
| 2007/0261114 | A1* | 11/2007 | Pomerantsev .......... G06F 21/33 726/12 |
| 2009/0112872 | A1 | 4/2009 | Doi |
| 2009/0319488 | A1* | 12/2009 | Faure ................ G06F 21/6254 |
| 2012/0303616 | A1* | 11/2012 | Abuelsaad .......... G06F 21/6227 707/736 |

FOREIGN PATENT DOCUMENTS

| | | |
|---|---|---|
| JP | 2005-304968 | 11/2005 |
| JP | 2005-304968 A | 11/2005 |
| JP | 2013-109577 A | 6/2013 |
| JP | 2013-250937 A | 12/2013 |

\* cited by examiner

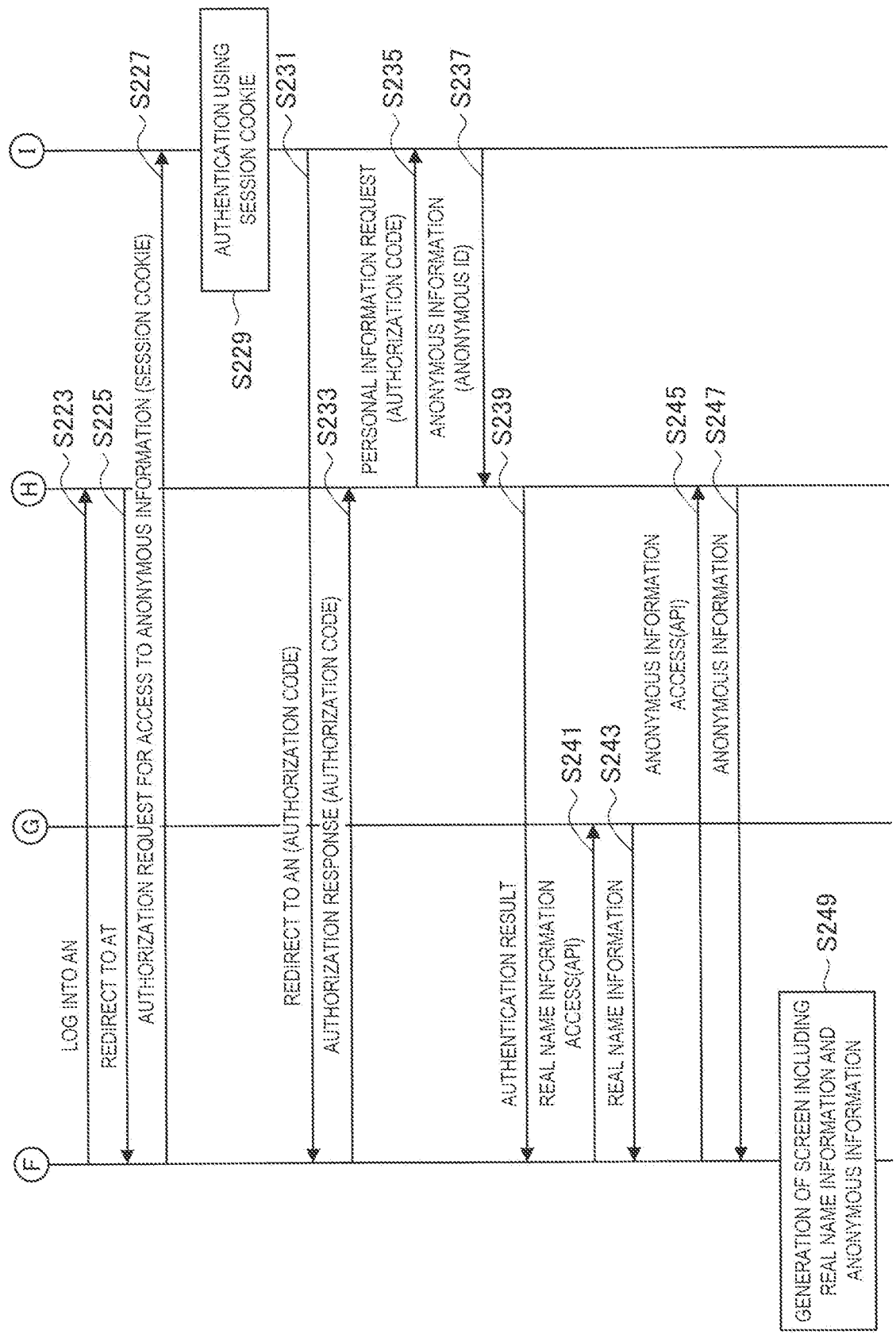

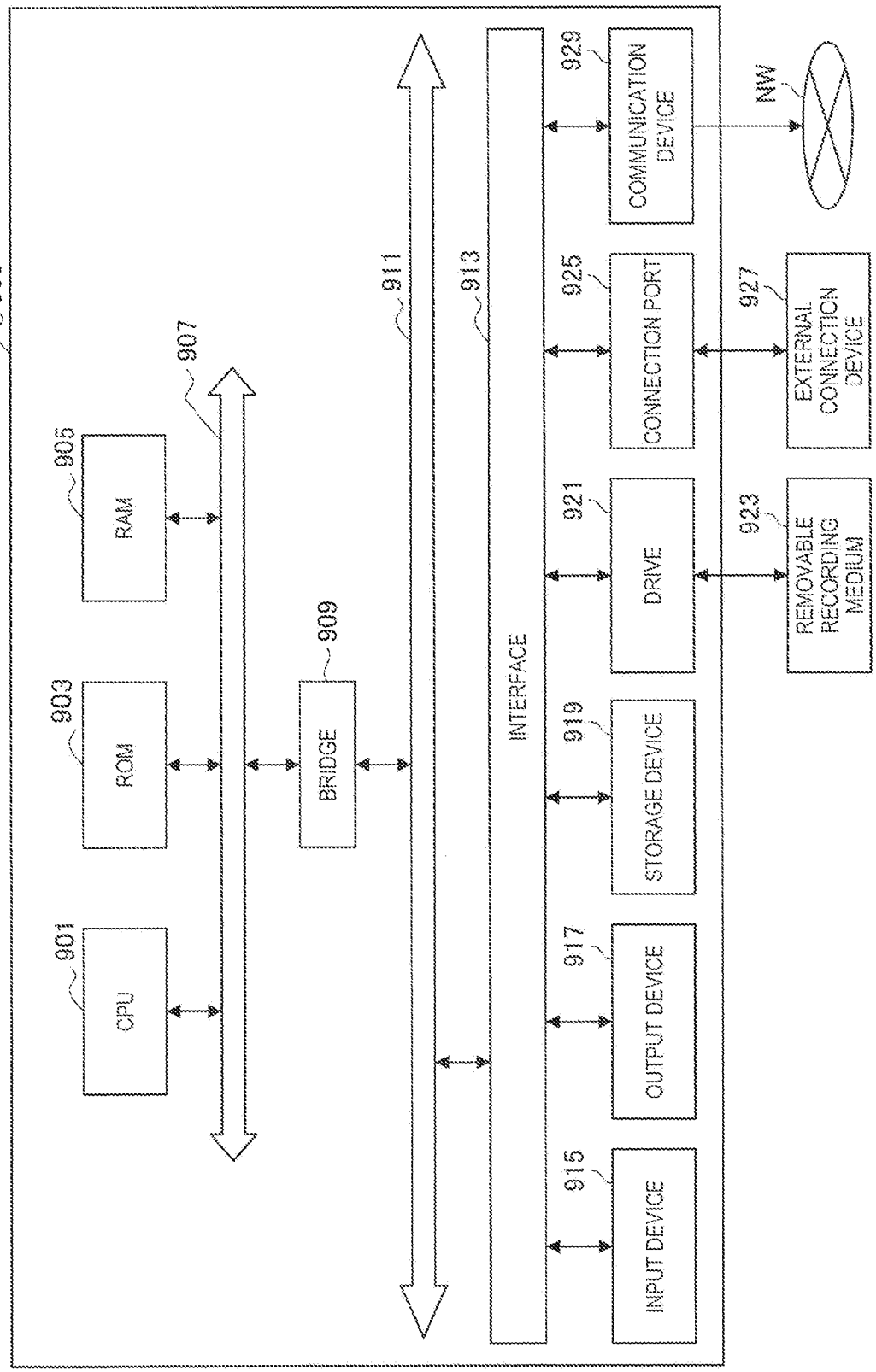

INFORMATION PROCESSING DEVICE, INFORMATION PROCESSING METHOD, AND MAPPING SERVER

CROSS REFERENCE TO RELATED APPLICATIONS

This application is a U.S. National Phase of International Patent Application No. PCT/JP2016/067272 filed on Jun. 9, 2016, which claims priority benefit of Japanese Patent Application No. JP 2015-184163 filed in the Japan Patent Office on Sep. 17, 2015. Each of the above-referenced applications is hereby incorporated herein by reference in its entirety.

TECHNICAL FIELD

The present disclosure relates to an information processing device, an information processing method, a program, and a mapping server.

BACKGROUND ART

Confidential information is sensitive information regarding, for example, an individual's health or lifestyle that the individual does not wish others to know. For example, biological information regarding an individual is the confidential information. Therefore, for example, in the case where anonymous information including confidential information such as the confidential information mentioned above has leaked from a server that stores the anonymous information in association with personal information, the social life of that individual may be grossly adversely affected. In light of the above, technology for managing the anonymous information in a state in which the anonymous information is separated from the personal information has been developed in recent years.

For example, in Patent Literature 1 described below, there is disclosed a technology for separating a server that stores personal information and a server that stores anonymous information from one another, to thereby provide a user with a service related to the anonymous information (hereinafter referred to as "anonymous service"), while also managing the anonymous information and the personal information separately from one another.

CITATION LIST

Patent Literature

Patent Literature 1: JP 2013-109577A

DISCLOSURE OF INVENTION

Technical Problem

However, with the technology disclosed in the above-mentioned Patent Literature 1, only the anonymous service is provided to the user in order to avoid a risk of the anonymous information, or the personal information that is associated with the anonymous information, leaking. Therefore, improving the convenience of the service using the anonymous information is desired.

In light of the above, the present disclosure proposes a new and improved information processing device, information processing method, program, and mapping server capable of improving the convenience of a service using anonymous information.

Solution to Problem

According to the present disclosure, there is provided an information processing device including: a real name information acquisition unit configured to acquire real name information from a real name server that stores a user ID and personal information in association with the real name information; an anonymous information acquisition unit configured to acquire anonymous information from an anonymous server that stores an anonymous ID in association with the anonymous information; and a screen generation unit configured to generate a display screen including the real name information and the anonymous information.

According to the present disclosure, there is provided an information processing method including: acquiring, by a processor, real name information from a real name server that stores a user ID and personal information in association with the real name information; acquiring, by the processor, anonymous information from an anonymous server that stores an anonymous ID in association with the anonymous information; and generating, by the processor, a display screen including the real name information and the anonymous information.

According to the present disclosure, there is provided a program for causing a computer to function as: a real name information acquisition unit configured to acquire real name information from a real name server that stores a user ID and personal information in association with the real name information; an anonymous information acquisition unit configured to acquire anonymous information from an anonymous server that stores an anonymous ID in association with the anonymous information; and a screen generation unit configured to generate a display screen including the real name information and the anonymous information.

According to the present disclosure, there is provided a mapping server including: a storage unit configured to store a user ID and an anonymous ID in association with each other; an information generation unit configured to generate identification information for identifying an external device on a basis of a result of user authentication in a case where the information generation unit receives, from the external device, an authorization request for accessing real name information stored in a real name server that stores the user ID and personal information in association with the real name information; a communication unit configured to transmit the identification information to the external device; and an authentication unit configured to perform, in a case where the authentication unit receives, from the external device, the identification information along with an authorization request for accessing anonymous information stored in an anonymous server that stores the anonymous ID in association with the anonymous information, authentication of the authorization request for accessing the anonymous information using the identification information received from the external device.

Advantageous Effects of Invention

As described above, according to the present disclosure, it is possible to improve the convenience of the service using the anonymous information.

Note that the effects described above are not necessarily limitative. With or in the place of the above effects, there

BRIEF DESCRIPTION OF DRAWINGS

FIG. 11 is a sequence diagram for describing a flow of processing performed by the information processing system according to the embodiment.

FIG. 12 is a block diagram illustrating an exemplary hardware configuration of an information processing device according to an embodiment of the present disclosure.

MODE(S) FOR CARRYING OUT THE INVENTION

Figure 1:
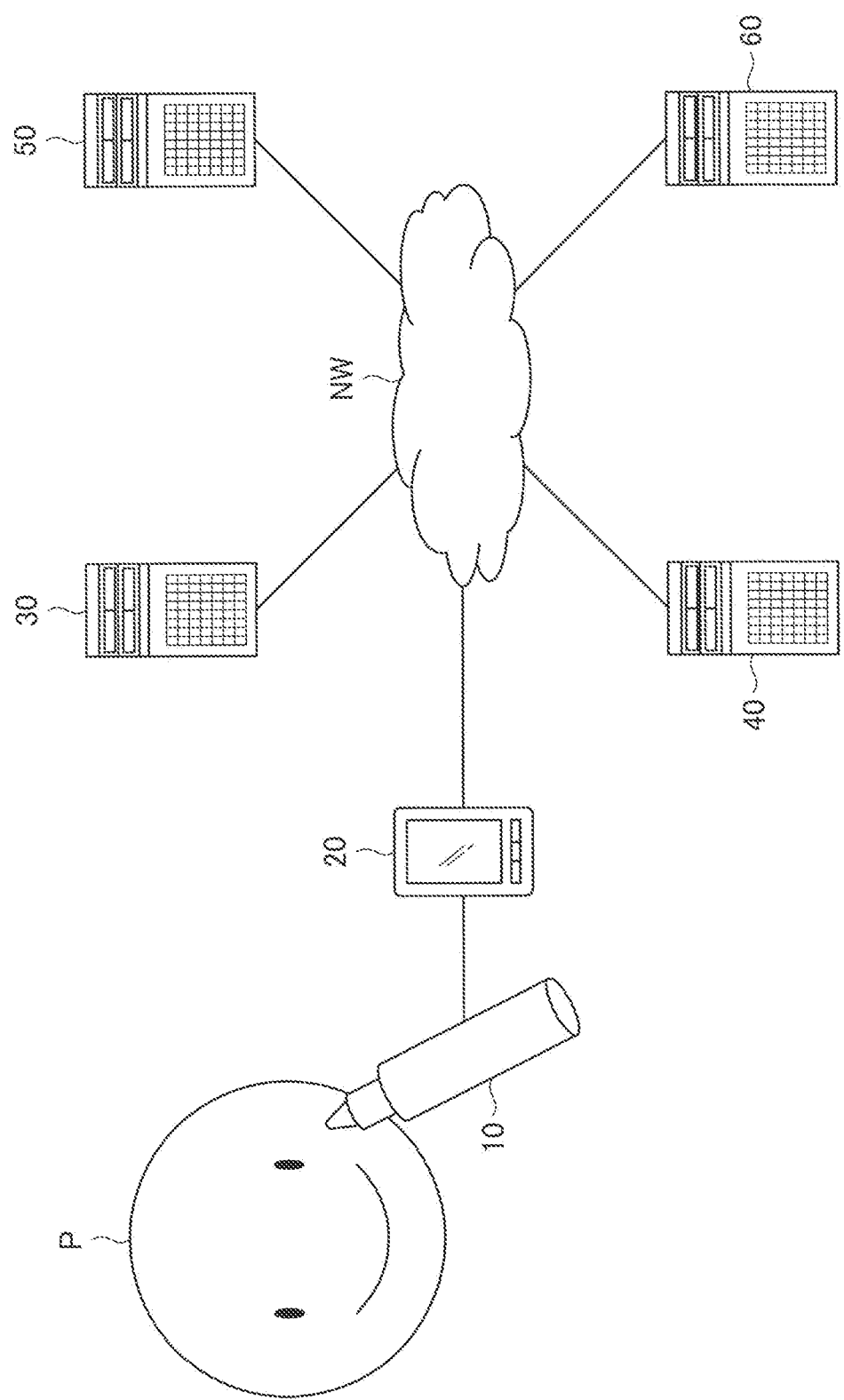
FIG. 1 is a diagram illustrating an overview of an information processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description is given in the following order:
1. Overview of information processing system
2. First embodiment
   2.1. Exemplary functional configurations
   2.2. Processing flow
   2.3. Effects
3. Second embodiment
4. Third embodiment
5. Exemplary hardware configuration
6. Conclusion

1. Overview of Information Processing System

First, an overview of an information processing system according to one embodiment of the present disclosure is described with reference to FIG. 1. FIG. 1 is a diagram illustrating an overview of an information processing system 1 according to one embodiment of the present disclosure. As illustrated in FIG. 1, the information processing system 1 includes an imaging device 10, an information processing device 20, a real name server 30, an anonymous server 40, a mapping server 50, and an authentication server 60. The imaging device 10 and the information processing device 20 are connected to one another via a wire, or wirelessly. The information processing device 20, the real name server 30, the anonymous server 40, the mapping server 50, and the authentication server 60 are connected to one another via a network NW. Note that the imaging device 10 and the information processing device 20 may be connected to one another via the network NW. In addition, the information processing system 1 does not always need to include the authentication server 60. In this case, user authentication processing performed by the authentication server 60 may be performed by, for example, an external authentication server.

The imaging device 10 is a device configured to generate a captured image. The imaging device 10 according to the present embodiment is implemented by, for example, a digital camera used for accurately imaging skin tissue of a user P. The imaging device 10 may also be implemented by, for example, any other device having an imaging function, such as a general-purpose digital camera, a smart phone, a tablet, a gaming device, or a wearable device. For example, the imaging device 10 images a real space using an imaging element such as a charge coupled device (CCD), or a complementary metal oxide semiconductor (CMOS), and various members such as a lens used for controlling image formation of a subject image on the imaging element. The imaging device 10 further includes a communication device for sending/receiving captured images and the like to/from the information processing device 20. Captured image data that is generated by the imaging device 10 is transmitted to the information processing device 20.

Note that in the case where the imaging device 10 is implemented by a imaging function of a smart phone, a tablet, or other device, the information processing system according to the present embodiment can be implemented by a device in which the imaging device 10 and the information processing device 20, which is described later, are integrated with one another. In such a case, the information processing system is implemented by the information processing device 20 and various servers.

The information processing device 20 is a device that has a function of communicating with the various servers. For example, the information processing device 20 according to the present embodiment is implemented by a smart phone. Otherwise, the information processing device 20 is implemented by any other device having an image analysis function, such as a personal computer (PC), a tablet, and a smart phone. The information processing device 20 may also be implemented by one or a plurality of information processing devices on a network. The information processing device 20 according to the present embodiment acquires a captured image from the imaging device 10, and transmits the acquired captured image to the anonymous server 40. The information processing device 20 also acquires personal information from the real name server 30, and acquires results of analysis processing performed by the anonymous server 40 from the anonymous server 40. The information acquired by the information processing device 20 is output to a storage unit, an output unit, or the like of the information processing device 20. Note that a functional configuration that implements various functions of the information processing device 20 is described later.

Note that in the present embodiment, the information processing device 20 has a configuration in which the information processing device 20 is separated from the imaging device 10, but the present technology is not limited to this example. For example, as in the case of a smart phone, a tablet, or the like, the information processing device 20 may perform processing (for example, imaging processing) related to the imaging device 10. In this case, the information processing system 1 is implemented by the information processing device 20 and the various servers. In addition, the imaging device 10 may perform processing (for example, communication processing) related to the information processing device 20. In this case, the information processing system 1 is implemented by the imaging device 10 and the various servers.

The real name server 30 is a server for providing a real name service using the personal information. For example, the real name server 30 stores personal information such as a user's name, contact information, and age in association with a user ID acquired from the authentication server 60, and provides real name information including the user ID, personal information, and other types of information to the information processing device 20. With the above-mentioned configuration, the user can receive a service using one's own personal information.

The anonymous server 40 is a server for providing an anonymous service using the anonymous information. The anonymous server 40 stores the anonymous information, which is information related to, for example, skin, health, or the like of a user, in association with an anonymous ID, and provides these pieces of anonymous information to the information processing device 20. The anonymous server 40, which stores the anonymous ID and the anonymous information, does not store the personal information. Therefore, because the personal information and the anonymous information are not associated with each other in the anonymous server 40, it is difficult to link the personal information and the anonymous information to each other, even in the case where the anonymous information stored in the anonymous server 40 has leaked.

Here, for example, confidential information is included in the anonymous information according to the present embodiment. Confidential information refers to information that the user does not wish others to know, and, for example, biological information such as health status, height, weight, and genetic information, and thoughts, creed, religion, race, health status, group activities, political activities, and the like are included as the confidential information. In the present embodiment, information regarding a person's skin, which corresponds to biological information, is treated as the confidential information in particular. Information regarding skin is also classified as the confidential information as this information is related to the health and lifestyle of a user.

The mapping server 50 is a server that performs various types of processing for enabling the information processing device 20 to access the real name server 30 and the anonymous server 40. For example, the mapping server 50 stores the user ID in association with the anonymous ID. With this configuration, it is possible to indirectly associate the real name information that is stored in the real name server 30 and associated with the user ID with the anonymous information that is stored in the anonymous server 40 and associated with the anonymous ID. Therefore, the anonymous information associated with the personal information can be accessed via the mapping server 50, and hence anonymous information specific to the user (for example, the information regarding the skin of the user) can be provided to that user.

In the case where the mapping server 50 acquires, for example, an authorization request for accessing the real name information stored in the real name server 30 from the information processing device 20, the mapping server 50 generates an authorization code and a session cookie for the real name server 30 on the basis of a result of user authentication performed by the authentication server 60 (in some cases, the mapping server 50), and transmits the authorization code and the session cookie to the information processing device 20. As a result, the information processing device 20 sends an authorization response to the real name server 30 using the acquired authorization code for the real name server 30, to thereby enable access to the real name server 30. In addition, in the case where the mapping server 50 acquires, for example, an authorization request for accessing the anonymous information stored in the anonymous server 40 from the information processing device 20, the mapping server 50 uses a session cookie transmitted from the information processing device 20 to generate an authorization code for the anonymous server 40 that is connected to the user ID, and transmits this authorization code to the information processing device 20. With this configuration, the information processing device 20 sends an authorization response to the anonymous server 40 using the acquired authorization code for the anonymous server 40, to thereby enable access to the anonymous server 40.

The authentication server 60 is a server that performs user authentication processing for accessing the real name information stored in the real name server 30 and the anonymous information stored in the anonymous server 40. The authentication server 60 may be a server for providing a service that comprehensively manages, for example, the personal information. For example, the authentication server 60 may be a server for providing a service that is managed by manager different to that of the services provided by the real name server 30, the anonymous server 40, and the mapping server 50. In addition, the authentication server 60 according to the present embodiment has a configuration in which the authentication server 60 is separated from the mapping server 50, but, in another embodiment, an authentication server 60 with the function of the mapping server 50 may be implemented. In this case, the information processing system 1 includes the imaging device 10, the information processing device 20, the real name server 30, the anonymous server 40, and the authentication server 60. In addition, as described above, the user authentication processing performed by the authentication server 60 may be performed by an external authentication server.

Note that in terms of risk management against the anonymous information and the personal information leaking, the real name server 30, the anonymous server 40, the mapping server 50, and the authentication server 60 may be implemented separately from one another. For example, the above-mentioned various servers may be implemented by cloud servers that are each operated by different vendors.

In addition, a secure application programming interface (API) authorization protocol such as OAuth (more specifically, OAuth 2.0), for example, may be used for a series of authorization processing (hereinafter referred to as "authorization processing") performed by the information processing device 20, the real name server 30, the anonymous server 40, the mapping server 50, and the authentication server 60.

Next, flow of a service provided by the information processing system 1 according to the present embodiment is described with reference to FIG. 2 to FIG. 5. The information processing system 1 according to the present embodiment analyzes the skin of a user P imaged by the imaging device 10, to thereby provide a service that outputs information regarding skin age, skin condition, and other factors to the user P. The user uses this service by operating an application that is installed on the information processing device 20. Note that in the following description of processing performed by the application, the information processing device 20 is implemented by a smart phone.

Figure 2:
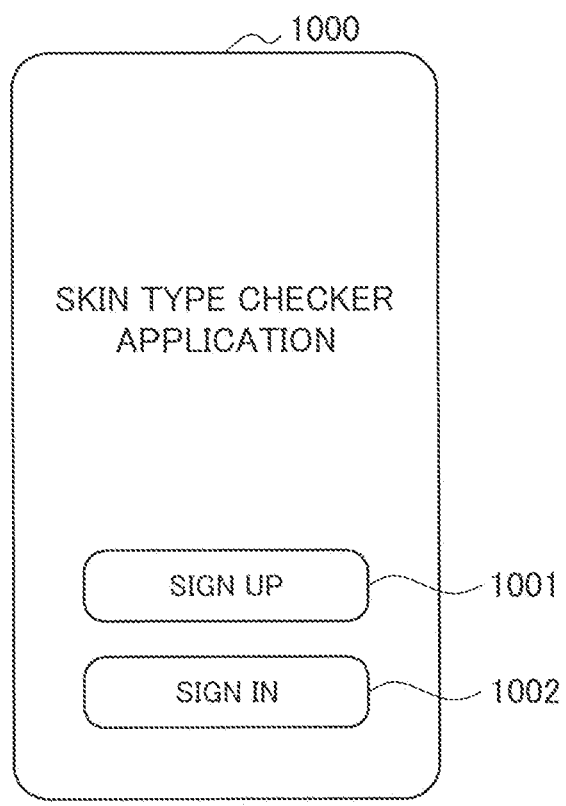
FIG. 2 is a diagram illustrating a first exemplary screen in authorization processing performed by an application according to the embodiment.

FIG. 2 is a diagram illustrating a first exemplary screen in the authorization processing performed by the application according to the present embodiment. As illustrated in FIG. 2, when the authorization processing according to the present embodiment starts, an application screen 1000 including a signup button 1001 and a sign in button 1002 for using a service called "Skin Type Checker Application" is displayed on a display unit of a smart phone 20. When the user P touches the signup button 1001 or the sign in button 1002, the application screen 1000 shifts to a screen related to either one of signup processing or sign in processing.

Figure 3:
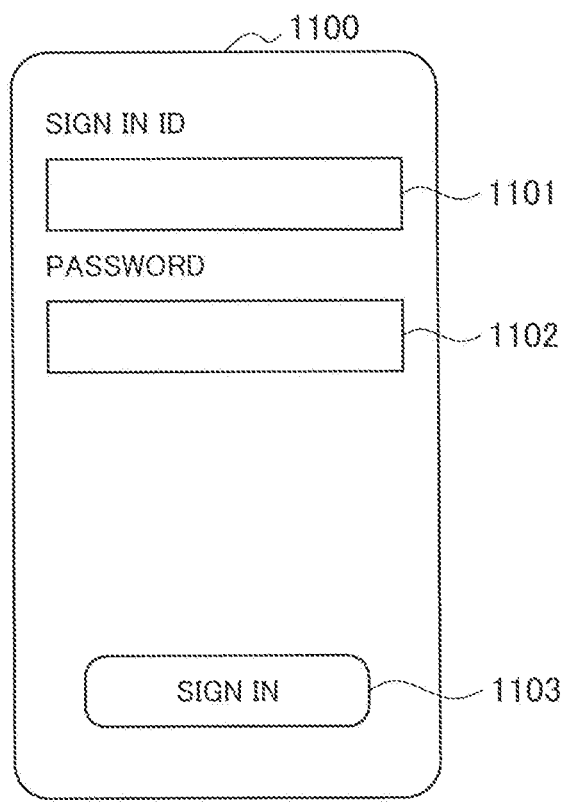
FIG. 3 is a diagram illustrating a second exemplary screen in authorization processing performed by an application according to the embodiment.

In the case where the sign in processing is selected according to the user P's operation, the application screen 1000 shifts to an application screen 1100 illustrated in FIG. 3. FIG. 3 is a diagram illustrating a second exemplary screen in the authorization processing performed by the application according to the present embodiment. As illustrated in FIG. 3, the application screen 1100 including an input section 1101 for a sign in ID, an input section 1102 for a password that corresponds to the sign in ID, and a button 1103 for performing the sign in processing is displayed on the display unit of the smart phone 20. Here, it is assumed that, according to the operation of the user P, a user ID for signing in to the authentication server 60 is input to the input section 1101 for a sign in ID, a password corresponding to the user ID is input to the input section 1102 for a password, and the button 1103 is touched. In this case, in the processing for signing into the service, the real name server 30, the anonymous server 40, the mapping server 50, and the authentication server 60 each perform authorization processing for accessing the real name information and the anonymous information regarding the user P. When each of those types of access authorization processing are complete, the user P can use the service using both of the real name information stored in the real name server 30 and the anonymous information stored in the anonymous server 40.

Figure 4:
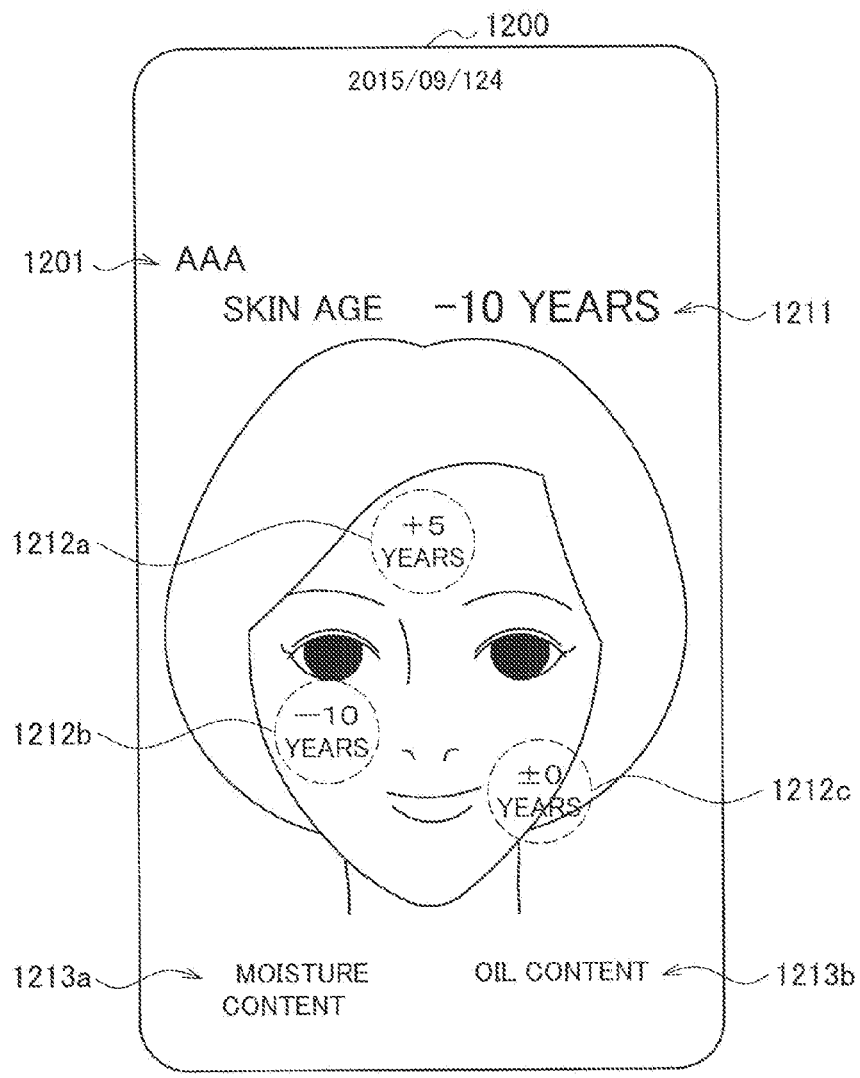
FIG. 4 is a diagram illustrating a first exemplary screen in display processing of analysis results performed by the application according to the embodiment.

When the analysis regarding the skin of the user P has finished after the authorization processing for the user P is complete, analysis results are displayed on the display unit of the smart phone 20. FIG. 4 is a diagram illustrating a first exemplary screen in display processing of analysis results performed by the application according to the present embodiment. As illustrated in FIG. 4, an application screen 1200 including a name 1201 of the user P, information 1211 that indicates skin age of the user P, information 1212a to 1212c that indicates skin ages of a forehead, cheek, and chin of the user P, and information 1213a and 1213b that indicates the condition of the skin of the user P is displayed on the display unit of the smart phone 20. The information that indicates the skin age and the condition of the skin is generated on the basis of results of analysis of a skin image generated by the imaging device 10. This analysis is performed by the anonymous server 40.

Among the information included in the application screen 1200, the name 1201 corresponds to the real name information acquired from the real name server 30 using a real name service API. On the other hand, the information 1211 that indicates the skin age of the user P, the information 1212 that indicates the skin age of various parts of the user P, and the information 1213 that indicates the condition of the skin of the user P corresponds to the anonymous information acquired from the anonymous server 40 using an anonymous service API. As described above, with the information processing system 1 according to the present embodiment, information including the real name information and the anonymous information is displayed on one screen.

Figure 5:
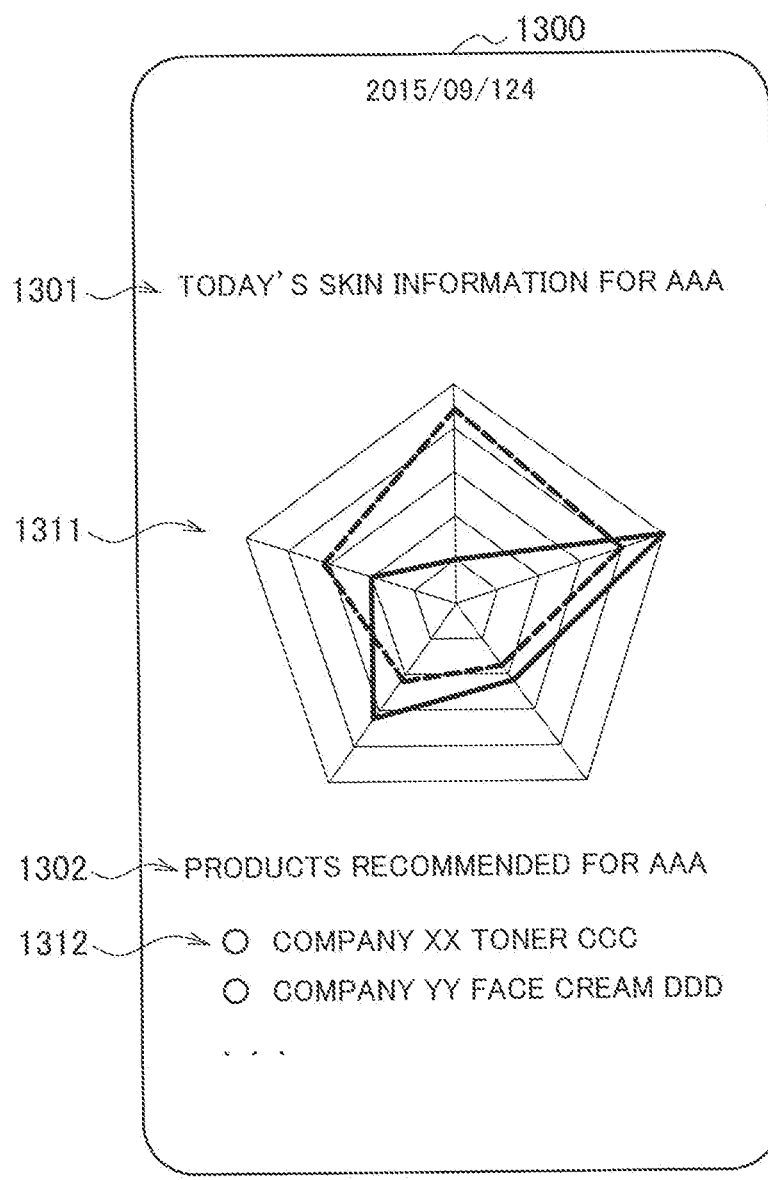
FIG. 5 is a diagram illustrating a second exemplary screen in display processing of analysis results performed by the application according to the embodiment.

Note that a screen different to that illustrated in FIG. 4 may be displayed as the analysis results related to the skin of the user P. FIG. 5 is a diagram illustrating a second exemplary screen in the display processing of the analysis results performed by the application according to the present embodiment. As illustrated in FIG. 5, in the display unit of the smart phone 20, information 1301 and 1302 including the personal information, and a graph 1311 and a list 1312 including the anonymous information are included in an application screen 1300. As illustrated in FIG. 4, the information regarding the skin may be displayed as a graph that radially shows parameters indicating the condition of the skin, such as a moisture content, color, and dewiness of the skin, in the same manner as, for example, the graph 1311. The information regarding the skin may also be displayed as a graph used for comparing previous analysis results (solid line) and current analysis results (broken line). In addition, as illustrated in the list 1312, the information regarding the skin may be used for marketing targeted at the user P.

BACKGROUND

Conventionally, in the case where the anonymous information described above is handled on a network, operating a completely anonymous service that is completely separate from the personal information, or encrypting the anonymous information on a client terminal have been carried out in consideration of the risk of the anonymous information leaking. However, in the case of the completely anonymous service, in order to avoid association with the personal information, user convenience was often compromised by, for example, issuing an account for using the anonymous service every time the user used the anonymous service. In addition, in the case of encrypting the anonymous information, it is difficult to provide the user with data using the anonymous information because the anonymous information cannot be analyzed on a cloud server.

The information processing system 1 according to one embodiment of the present disclosure makes it possible to provide the user with services using both the real name information and the anonymous information at the same time, without directly linking the real name information to the anonymous information. With this system, it is possible to reduce loss experienced by the user due to anonymous information leaking, and increase the convenience of the service using the anonymous information. Therefore, the user can receive a wide array of services related to the anonymous information.

2. First Embodiment

[2.1. Exemplary Functional Configurations]

Firstly, exemplary functional configurations of each of the elements that configure the information processing system 1 according to a first embodiment of the present disclosure are described. Exemplary internal functional configurations of the information processing device 20 and the mapping server 50 in particular are described below. Note that while descriptions of internal functional configurations of the real name server 30, the anonymous server 40, and the authentication server 60 are omitted, in the present embodiment, these servers include a communication device as communication means, a processing circuit implemented by a central processing unit (CPU) or the like, a main storage device such as a read only memory (ROM) or a random access memory (RAM), or a storage device implemented by a storage memory device such as a hard disc drive (HDD), a solid state drive (SSD), or a flash memory.

Information Processing Device

Figure 6:
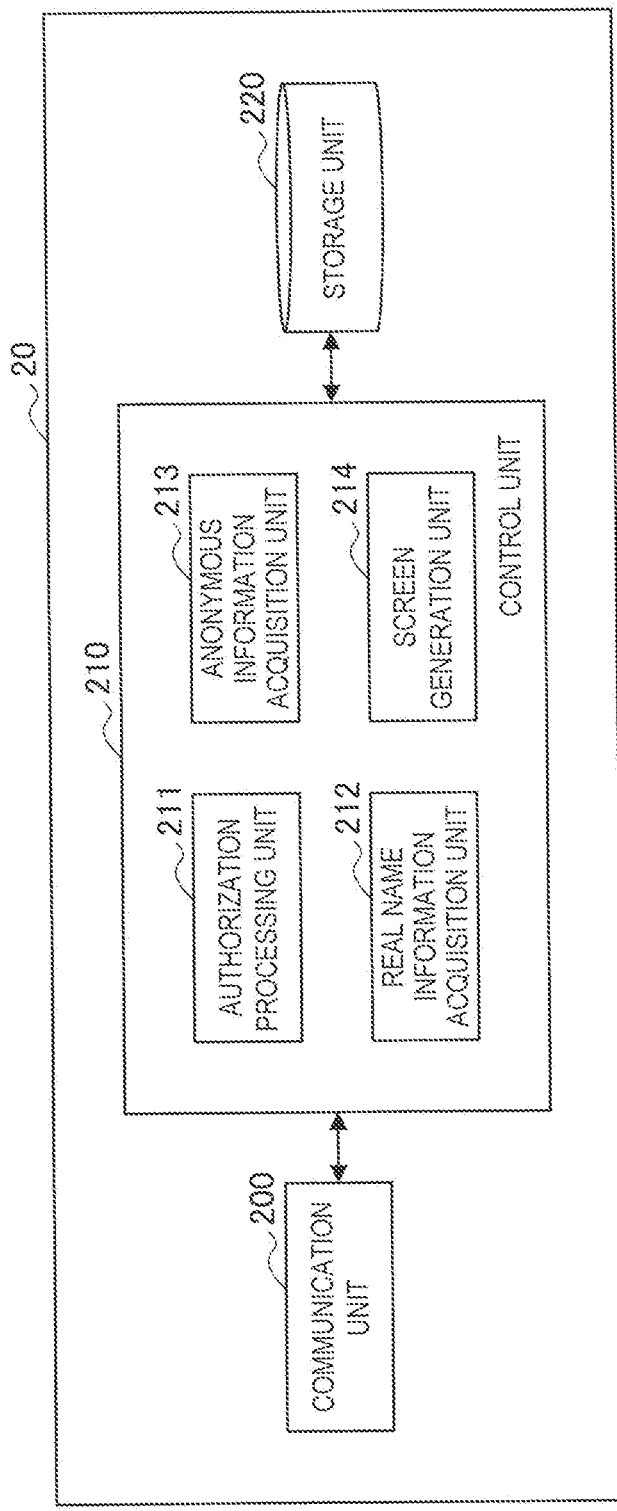
FIG. 6 is a block diagram illustrating an exemplary configuration of an information processing device according to a first embodiment of the present disclosure.

FIG. 6 is a block diagram illustrating an exemplary configuration of the information processing device 20 according to the first embodiment of the present disclosure. As illustrated in FIG. 6, the information processing device 20 includes a communication unit 200, a control unit 210, and a storage unit 220.

(Communication Unit)

The communication unit 200 corresponds to communication means included in the information processing device 20, and is configured to communicate with an external device such as a server directly, or via, for example, the network NW in a wired or wireless manner. In addition, communication by the communication unit 200 is controlled by, for example, the control unit 210.

(Control Unit)

The control unit 210 controls every operation of the information processing device 20. In addition, the control unit 210 includes an authorization processing unit 211, a real name information acquisition unit 212, an anonymous information acquisition unit 213, and a screen generation unit 214, and takes initiative of the operations of the information processing device 20 according to the present embodiment. Functions of each of the functional units included in the control unit 210 are described below.

(Authorization Processing Unit)

The authorization processing unit 211 has a function of performing processing for authorizing access to the real name information stored in the real name server 30 by the real name information acquisition unit 212 to be described later, and access to the anonymous information stored in the anonymous server 40 by the anonymous information acquisition unit 213.

For example, the authorization processing unit 211 transmits the authorization request for accessing the real name information (hereinafter referred to as "real name information access authorization request") to the mapping server 50. At this time, the mapping server 50 authorizes the real name information access authorization request on the basis of a user authentication result in the authentication server 60. Specifically, when the mapping server 50 authorizes the real name information access authorization request, the mapping server 50 issues an authorization code that allows access to the real name information stored in the real name server 30, and transmits this authorization code to the authorization processing unit 211. Then, when the authorization processing unit 211 transmits the authorization code to the real name server 30, the real name server 30 acquires a user ID and personal information corresponding to the authorization code from the mapping server 50. With this configuration, it is assumed that the information processing device 20 has logged into the real name server 30, and hence access to the real name information stored in the real name server 30 is possible.

In this case, when the authorization processing unit 211 receives the above-mentioned authorization code, the authorization processing unit 211 also receives the session cookie generated in the mapping server 50. The session cookie is an example of identification information, and is temporary information associated with the user ID and the anonymous ID. This session cookie is valid for a period during which a session between the information processing device 20 and the mapping server 50 continues. Therefore, through using this session cookie, the authorization processing unit 211 can log into the anonymous server 40 without using the user ID and the anonymous ID.

For example, the authorization processing unit 211 transmits an authorization request for accessing the anonymous information (hereinafter referred to as "anonymous information access authorization request") to the mapping server 50. At this time, the authorization processing unit 211 transmits the above-mentioned session cookie to the mapping server 50 along with the anonymous information access authorization request. The mapping server 50 authenticates the anonymous information access authorization request using the session cookie transmitted from the authorization processing unit 211. In the case where the transmitted session cookie is authenticated as a session cookie that has been transmitted from the information processing device 20, which received the authorization code for enabling access to the real name information stored in the real name server 30, the mapping server 50 issues an authorization code for enabling access to the anonymous information stored in the anonymous server 40, and transmits this authorization code to the authorization processing unit 211. When the authorization processing unit 211 transmits the authorization code to the anonymous server 40, the anonymous server 40 acquires the anonymous ID corresponding to the authorization code from the mapping server 50. With this configuration, it is assumed that the information processing device 20 has logged into the anonymous server 40, and hence access to the anonymous information stored in the anonymous server 40 is possible.

A specific flow of the authorization processing performed by the authorization processing unit 211 is described in the authorization processing flow to be described later.

(Real Name Information Acquisition Unit)

The real name information acquisition unit 212 acquires the real name information stored in the real name server 30, and outputs the real name information to the screen generation unit 214. Processing performed by the real name information acquisition unit 212 is carried out after the authorization processing performed by the authorization processing unit 211 is complete. This processing can be iterated as long as a session between the information processing device 20 and the mapping server 50 continues.

(Anonymous Information Acquisition Unit)

The anonymous information acquisition unit 213 acquires the anonymous information stored in the anonymous server 40, and outputs the anonymous information to the screen generation unit 214. Processing performed by the anonymous information acquisition unit 213 is performed after the authorization processing performed by the authorization processing unit 211 is complete. This processing can be iterated as long as a session between the information processing device 20 and the mapping server 50 continues.

(Screen Generation Unit)

The screen generation unit 214 generates a screen including the real name information acquired by the real name information acquisition unit 212 and the anonymous information acquired by the anonymous information acquisition unit 213. The generated screen may be, for example, displayed on a display unit (not shown) of the information processing device 20, may be transmitted to another information processing device or other device via the communication unit 200, or may be stored in the storage unit 220.

(Storage Unit)

The storage unit 220 corresponds to storage means included in the information processing device 20, and stores the information acquired by the communication unit 200, the information obtained by the functional units of the control unit 210, or other pieces of information.

Mapping Server

Figure 7:
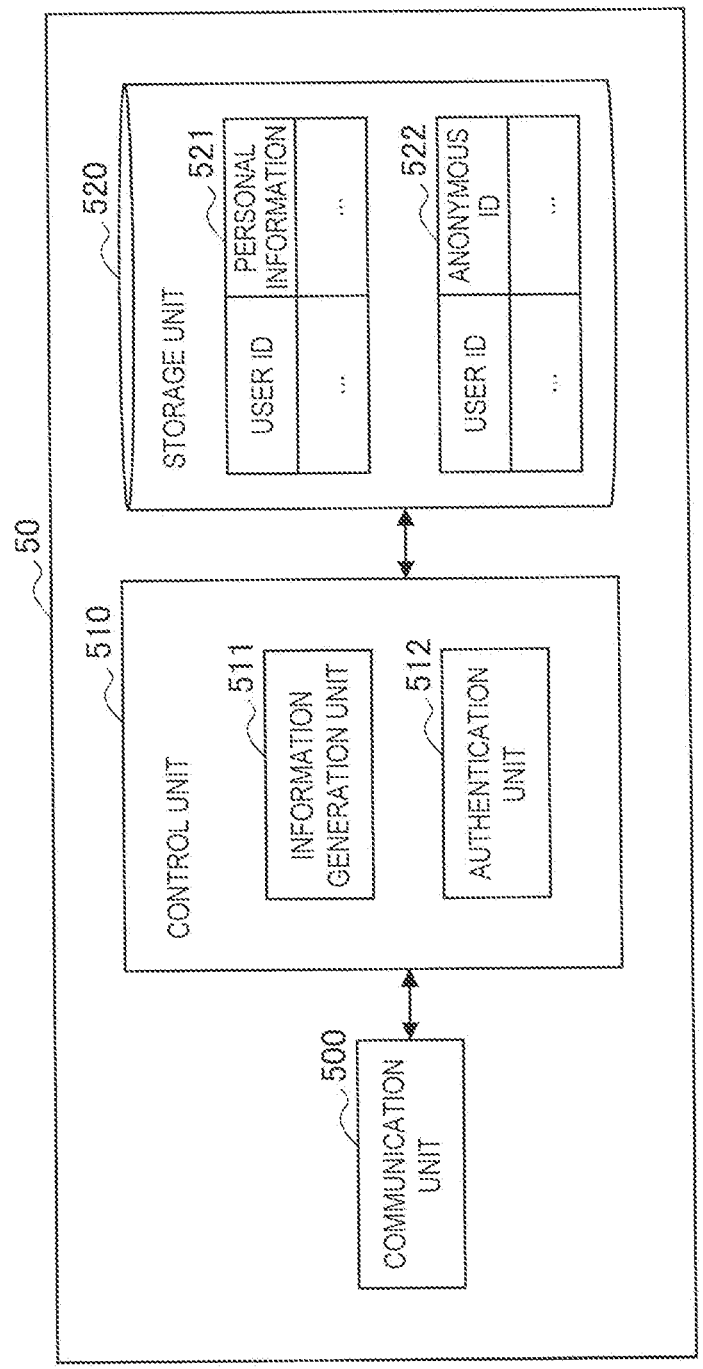
FIG. 7 is a block diagram illustrating an exemplary configuration of a mapping server according to the embodiment.

Next, an exemplary internal functional configuration of the mapping server 50 is described. FIG. 7 is a block diagram illustrating an exemplary configuration of the mapping server 50 according to the first embodiment of the present disclosure. As illustrated in FIG. 7, the mapping server 50 includes a communication unit 500, a control unit 510, and a storage unit 520.

(Communication Unit)

The communication unit 500 corresponds to communication means included in the mapping server 50, and communicates with an external device such as a server directly, or via, for example, the network NW in a wireless or wired manner. In addition, communication by the communication unit 500 is controlled by, for example, the control unit 510. The communication unit 500 sends/receives information related to access authorization or user authentication to/from the information processing device 20, for example.

(Control Unit)

The control unit 510 controls every operation of the mapping server 50. In addition, the control unit 510 includes an information generation unit 511, and an authentication unit 512, and takes initiative of the operations of the mapping server 50 according to the present embodiment. The functions of each of the functional units included in the control unit 510 are described below.

(Information Generation Unit)

In the case where the information generation unit 511 receives the real name information access authorization request from the information processing device 20, the information generation unit 511 generates a session cookie (identification information) for identifying the information processing device 20 on the basis of the result of user authentication in the authentication server 60. The generated session cookie is transmitted to the information processing device 20 by the communication unit 500. Note that the information generation unit 511 at this time may generate an authorization code for enabling access to the real name information stored in the real name server 30. The generated authorization code is associated with the user ID in the mapping server 50, and is transmitted to the information processing device 20 by the communication unit 500.

(Authentication Unit)

In the case where the authentication unit 512 receives the anonymous information access authorization request from the information processing device 20, the authentication unit 512 authenticates the request using a session cookie received together with the request. For example, in the case where a transmission destination of the session cookie and a transmission destination of the authorization code for enabling access to the real name information stored in the real name server 30 match, the authentication unit 512 authenticates the information processing device 20, which is the transmission destination. At this time, in the case where the authentication unit 512 authenticates the information processing device 20, in the case where the information processing device 20 is authenticated by the authentication unit 512, the mapping server 50 generates an authorization code for enabling access to the anonymous information stored in the anonymous server 40, and transmits this authorization code to the information processing device 20 via the communication unit 500. Note that the authorization code generated at this time for enabling access to the anonymous information is associated with the anonymous ID, and this anonymous ID is connected, in the mapping server 50, to the user ID associated with the authorization code for enabling access to the real name information transmitted to the information processing device 20.

(Storage Unit)

The storage unit 520 corresponds to storage means included in the mapping server 50, and stores the information acquired by the communication unit 500, the information acquired by each of the functional units of the control unit 510, or other pieces of information. The storage unit 520 according to the present embodiment further includes a database 521 that stores data in which the user ID and the personal information are associated with each other, and a database 522 that stores data in which the user ID and the anonymous ID are associated with each other.

[2.2. Processing Flow]

The information processing device 20 and the mapping server 50 according to the present embodiment have been described above. Next, processing performed by the information processing system 1 according to the present embodiment is described.

Figure 8:
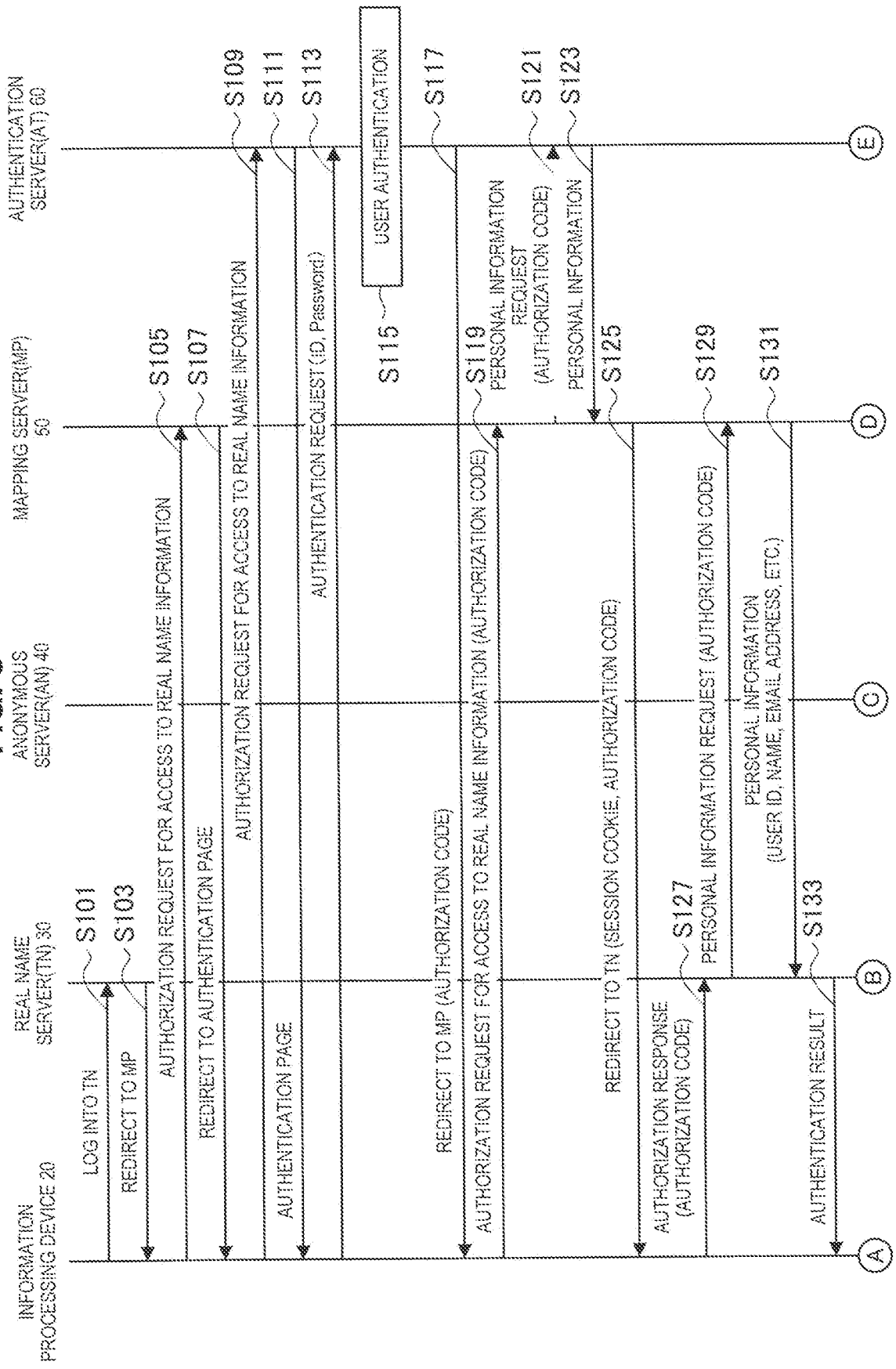
FIG. 8 is a sequence diagram for describing a flow of processing performed by an information processing system according to the embodiment.
Figure 9:
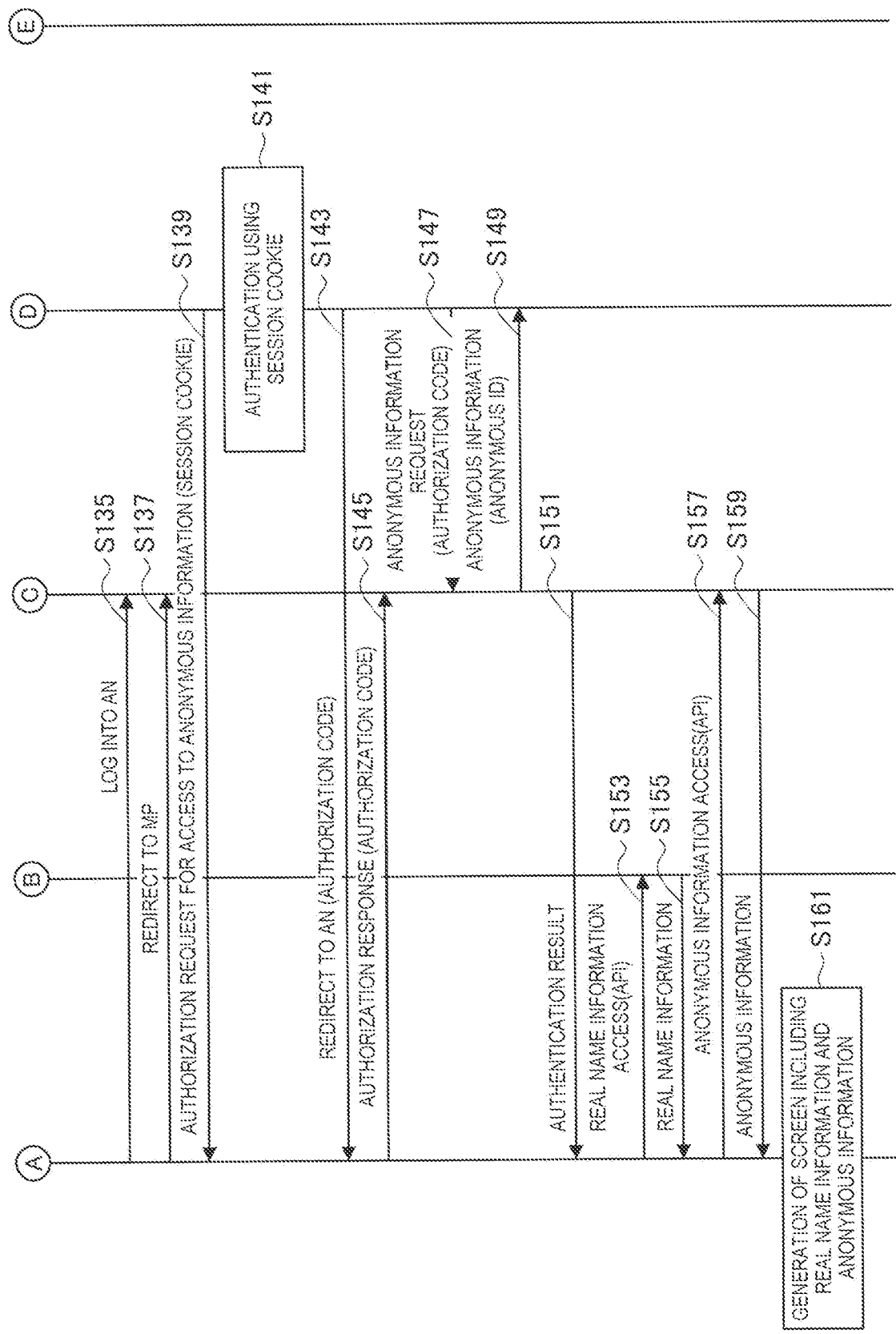
FIG. 9 is a sequence diagram for describing a flow of processing performed by the information processing system according to the embodiment.

FIG. 8 and FIG. 9 are sequence diagrams for describing a flow of processing performed by the information processing system 1 according to the present embodiment. The flow of processing illustrated in FIG. 8 and FIG. 9 is divided into the following three stages: real name information access authorization processing (Steps S101 to S133 in FIG. 8), anonymous information access authorization processing (Steps S135 to S151 in FIG. 9), and information acquisition processing (Steps S153 to S161 in FIG. 9). In addition, the real name information access authorization processing further includes the authentication processing performed by the authentication server 60. This authentication processing is separated from the mapping server 50, and is performed in the authentication server 60, to thereby enable the mapping server 50 to perform processing of indirectly associating the real name information and the anonymous information with one another using an authentication service that has been conventionally operated, which is carried out by the authentication server 60. Therefore, an authentication server does not need to be newly provided on the service side. As a result, the manager of the service only needs to provide the mapping server 50, and this reduces the burden placed on the manager.

(Real Name Information Access Authentication Processing)

First, the real name information access authorization processing is described with reference to FIG. 8. The authorization processing unit 211 of the information processing device 20 starts processing of logging into the real name server 30 (S101). The real name server 30 commands the information processing device 20 to redirect to the mapping server 50 (S103).

Next, the authorization processing unit 211 transmits the authorization request for accessing the real name information to the mapping server 50, which is the redirect destination (S105). The mapping server 50 receives this request, and commands the information processing device 20 to redirect to the authentication server 60 (S107).

Subsequently, the authorization processing unit 211 transmits the authorization request for accessing the real name information to the authentication server 60, which is the redirect destination (S109). The authentication server 60 receives this request, and discloses a page for authentication to the information processing device 20 (S111).

Next, the authorization processing unit 211 transmits authentication request information (the user ID, the password, and the like of the authentication server 60), which has been input according to an operation by the user or other means to the authentication server 60 (S113). The authentication server 60 performs user authentication on the received authentication request information (S115). When the user authentication is successful, the authentication server 60 transmits the authorization code (hereinafter referred to as "first authorization code") for enabling access to the personal information, such as the user ID, stored in the mapping server 50 to the information processing device 20, and also commands the information processing device 20 to redirect to the mapping server 50 (S117).

Subsequently, the authorization processing unit 211 again transmits the authorization request for accessing the real name information along with the first authorization code to the mapping server 50, which is the redirect destination (S119). When the mapping server 50 receives this request and the first authorization code, the mapping server 50 transmits a personal information request along with the first authorization code to the authentication server 60 (S121). The authentication server 60 refers to the received first authorization code and the first authorization code that was transmitted to the information processing device 20, and transmits to the mapping server 50 personal information (including the user ID, for example) that is associated with the first authorization codes that were referred to (S123).

Next, the mapping server 50 generates an authorization code (hereinafter referred to as "second authorization code") for enabling access to the real name information stored in the real name server 30, and a session cookie for identifying the information processing device 20, transmits the second authorization code and the session cookie to the information processing device 20, and commands the information processing device 20 to redirect to the real name server 30 (S125). Note that the second authorization code is associated with the personal information such as the user ID in the mapping server 50.

Subsequently, the authorization processing unit 211 uses the second authorization code to send an authorization response to the real name server 30 (S127). After receiving the authorization response, the real name server 30 transmits the personal information request along with the received second authorization code to the mapping server 50 (S129). The mapping server 50 refers to the received second authorization code and the second authorization code that was transmitted to the information processing device 20, and transmits to the real name server 30 personal information that is associated with the second authorization codes that were referred to (S131).

Next, the real name server 30 transmits authorization processing results to the information processing device 20 (S133). With this, the real name information access authorization processing performed by the authorization processing unit 211 is complete. Note that the anonymous information access authorization processing performed by the authorization processing unit 211 may be automatically started after the processing in Step S133, or may be started by an operation by the user of the information processing device 20 after the user is notified of the completion of the real name information access authorization processing.

(Anonymous Information Access Authentication Processing)

Next, the anonymous information access authorization processing is described with reference to FIG. 9. First, the authorization processing unit 211 starts processing of logging into the anonymous server 40 (S135). The anonymous server 40 commands the information processing device 20 to redirect to the mapping server 50 (S137).

Subsequently, the authorization processing unit 211 transmits an authorization request for accessing the anonymous information along with a session cookie to the mapping server 50, which is the redirect destination (S139). The mapping server 50 performs authentication using the received session cookie (S141). When authentication using the session cookie is successful, the mapping server 50 generates an authorization code (hereinafter referred to as "third authorization code") for access to the anonymous information stored in the anonymous server 40, transmits the third authorization code to the information processing device 20, and commands the information processing device 20 to redirect to the anonymous server 40 (S143). Note that the third authorization code is associated with the anonymous ID in the mapping server 50.

Next, the authorization processing unit 211 uses the third authorization code to send an authorization response to the anonymous server 40 (S145). After receiving the authorization response, the anonymous server 40 transmits an anonymous information request along with the received third authorization code to the mapping server 50 (S147). The mapping server 50 refers to the received third authorization code and the third authorization code that was transmitted to the information processing device 20, and transmits to the anonymous server 40 anonymous information (the anonymous ID, for example) that is associated with the third authorization codes that were referred to (S149).

Next, the anonymous server 40 transmits authorization processing results to the information processing device 20 (S151). With this, the anonymous information access authorization processing performed by the authorization processing unit 211 is complete.

(Information Acquisition Processing)

In the case where the real name information access authorization processing and the anonymous information access authorization processing performed by the authorization processing unit 211 are complete, information acquisition processing performed by the real name information acquisition unit 212 and the anonymous information acquisition unit 213 starts.

The real name information acquisition unit 212 uses a real name service API to access the real name server 30 (S153). The real name server 30 transmits real name information that satisfies a request from the real name information acquisition unit 212 to the information processing device 20 (S155). In a similar manner, the anonymous information acquisition unit 213 uses an anonymous service API to access the anonymous server 40 (S157). The anonymous server 40 transmits anonymous information that satisfies a request from the anonymous information acquisition unit 213 to the information processing device 20 (S159). Then, the screen generation unit 214 generates a screen including the received real name information and anonymous information (S161).

[2.3. Effects]

Configurations of the information processing system 1, the information processing device 20, and the mapping server 50, and the processing performed by the information processing system 1, according to the first embodiment of the present disclosure have been described above. According to the present embodiment, the information processing device 20 acquires the real name information from the real name server 30, acquires the anonymous information from the anonymous server 40, and generates a screen including the real name information and the anonymous information. With this configuration, both the anonymous information and the real name information are provided to the user, and the convenience of the service using the anonymous information can be improved. In addition, according to the present embodiment, the information processing device 20 performs processing for authorizing access to the real name information stored in the real name server 30 and the anonymous information stored in the anonymous server 40 on the basis of the user authentication processing performed by the authentication server 60, and the authorization processing using the identification information performed by the mapping server 50. With this configuration, it is possible to generate a screen for displaying the real name information and the anonymous information to a user who uses the information processing device 20, without the real name server 30 and the anonymous server 40 directly associating the pieces of information with each other. Therefore, the user can receive a service specific to the individual while using the anonymous information.

3. Second Embodiment

The information processing system 1 according to the first embodiment of the present disclosure has been described above. Next, a second embodiment of the present disclosure is described. In the present embodiment, the information processing system 1 has a configuration in which the authentication server 60 includes an authorization processing function that is implemented by the mapping server 50. In other words, the information processing system 1 according to the present embodiment includes the imaging device 10, the information processing device 20, the real name server 30, the anonymous server 40, and the authentication server 60.

The functional configuration of each of the structural elements of the information processing system 1 according to the present embodiment is the same as that of each of the structural elements according to the first embodiment of the present disclosure, and hence a description thereof is omitted. Processing performed by the information processing system 1 according to the present embodiment is described below with reference to FIG. 10 and FIG. 11.

Figure 10:
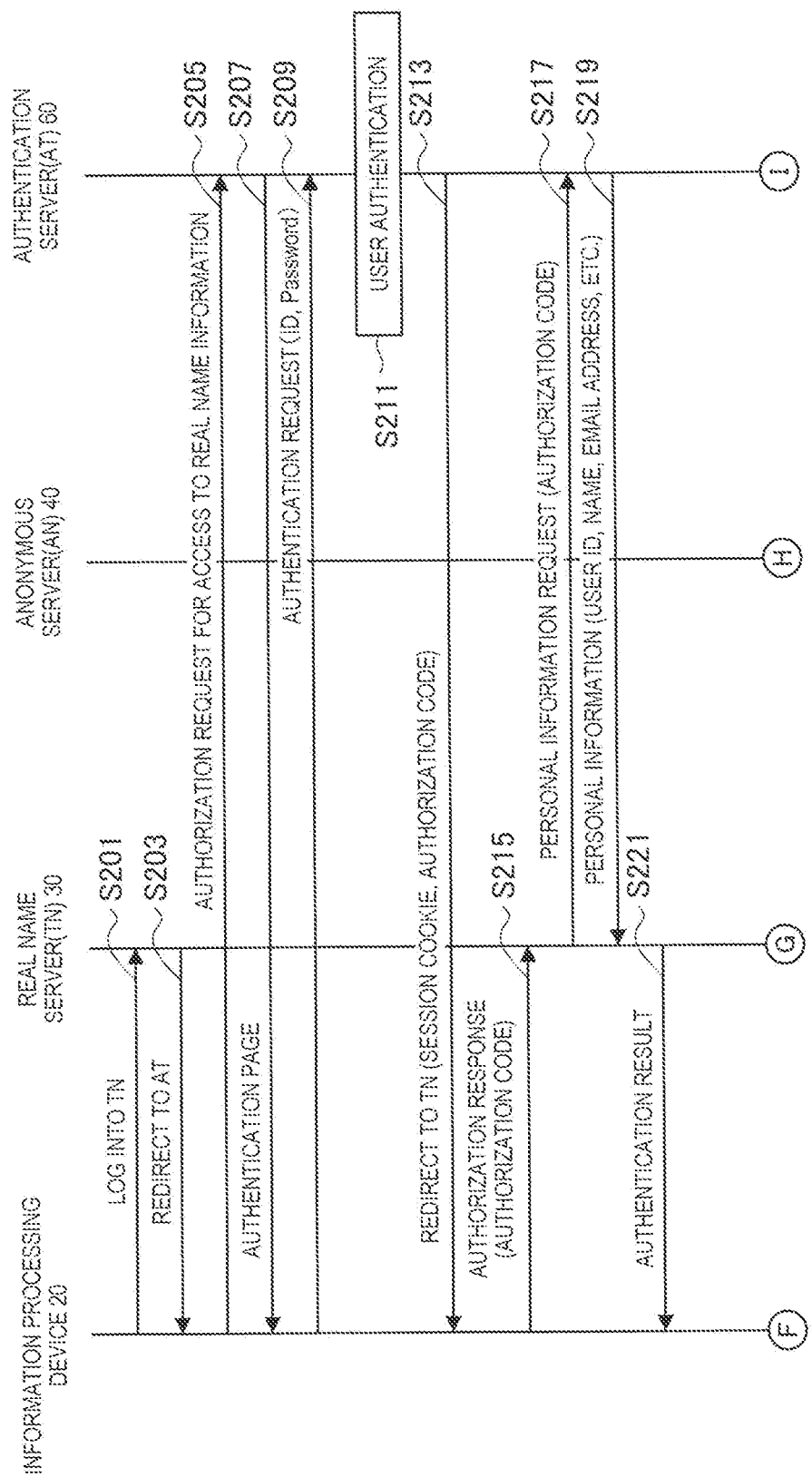
FIG. 10 is a sequence diagram for describing a flow of processing performed by an information processing system according to a second embodiment of the present disclosure.

FIG. 10 and FIG. 11 are sequence diagrams for describing a flow of processing performed by the information processing system 1 according to the second embodiment of the present disclosure. The processing flow illustrated in FIG. 10 and FIG. 11 is divided into the following three stages: real name information access authorization processing (Steps S201 to S221 in FIG. 10), anonymous information access authorization processing (Steps S223 to S239 in FIG. 11), and information acquisition processing (Steps S241 to S249 in FIG. 11). The real name information access authorization processing according to the present embodiment is performed in the authentication server 60. Note that the anonymous information access authorization processing and the information acquisition processing according to the present embodiment are the same as those according to the first embodiment of the present disclosure, and hence a description thereof is omitted.

(Real Name Information Access Authentication Processing)

The real name information access authorization processing is described with reference to FIG. 10. First, the authorization processing unit 211 of the information processing device 20 starts processing of logging into the real name server 30 (S201). The real name server 30 commands the information processing device 20 to redirect to the authentication server 60 (S203).

Next, the authorization processing unit 211 transmits an authorization request for accessing the real name information to the authentication server 60, which is the redirect destination (S205). The authentication server 60 receives this request, and discloses a page for authentication to the information processing device 20 (S207).

Subsequently, the authorization processing unit 211 transmits authentication request information that is input according to, for example, an operation by the user to the authentication server 60 (S209). The authentication server 60 performs user authentication on the received authentication request information (S211). When the user authentication is successful, the authentication server 60 generates an authorization code (hereinafter referred to as "fourth authorization code") for access to the real name information stored in the real name server 30, and a session cookie for identifying the information processing device 20, transmits the fourth authorization code and the session cookie to the information processing device 20, and commands the information processing device 20 to redirect to the real name server 30 (S213). Note that the fourth authorization code is associated with the personal information such as the user ID in the authentication server 60.

Next, the authorization processing unit 211 uses the fourth authorization code to send an authorization response to the real name server 30 (S215). After receiving the authorization response, the real name server 30 transmits a personal information request along with the received fourth authorization code to the authentication server 60 (S217). The authentication server 60 refers to the received fourth authorization code and the fourth authorization code that was transmitted to the information processing device 20, and transmits to the real name server 30 personal information associated with the fourth authorization codes that were referred to (S219).

Subsequently, the real name server 30 transmits authorization processing results to the information processing device 20 (S221). With this, the real name information access authorization processing performed by the authorization processing unit 211 is complete.

The processing performed by the information processing system 1 according to the second embodiment of the present disclosure has been described above. In the present embodiment, the functions of the mapping server 50 according to the first embodiment of the present disclosure are included in the authentication server 60. With this configuration, in the case where the manager owns the authentication server 60 at one's own expense, it becomes possible to indirectly associate the real name information and the anonymous information with each other via the authentication server 60, through incorporating the functions of the mapping server 50 into the authentication server 60. Therefore, it is possible to provide a service using the anonymous information that is specific to an individual using a conventional authentication service.

4. Third Embodiment

The information processing system 1 according to the second embodiment of the present disclosure has been described above. Next, a third embodiment of the present disclosure is described. In the present embodiment, the anonymous server 40 provides the anonymous information to a third-party server that implements a service (a so-called "third party service") managed by a third party. With this configuration, it is possible to provide a third-party service using anonymous information that is associated with the user.

For example, in the case where an application that corresponds to the third-party service is installed on the information processing device 20, the information processing device 20 performs authorization processing for accessing the anonymous information stored in the anonymous server 40 via the application. If the authorization processing is performed via the application, the third-party server can use an anonymous service API to access the anonymous information stored in the anonymous server 40. The third-party server analyzes the anonymous information acquired from the anonymous server 40, and transmits the analysis results to the information processing device 20. With this configuration, the user who uses the information processing device 20 can obtain analysis results based on the anonymous information via the application that corresponds to the third-party service.

5. Exemplary Hardware Configuration

Next, with reference to FIG. 12, a hardware configuration of an information processing device according to an embodiment of the present disclosure is described. FIG. 12 is a block diagram illustrating an exemplary hardware configuration of the information processing device according to the embodiment of the present disclosure. An information processing device 900 illustrated in FIG. 12 can implement, for example, the information processing device 20, the real name server 30, the anonymous server 40, the mapping server 50, and the authentication server 60 according to the above-described embodiments.

The information processing device 900 includes a central processing unit (CPU) 901, a read only memory (ROM) 903, and a random access memory (RAM) 905. In addition, the information processing device 900 may include a host bus 907, a bridge 909, an external bus 911, an interface 913, an input device 915, an output device 917, a storage device 919, a drive 921, a connection port 925, and a communication device 929. The information processing device 900 may include a processing circuit such as a digital signal processor (DSP) or an application specific integrated circuit (ASIC) instead of or in addition to the CPU 901.

The CPU 901 serves as an operation processing device and a control device, and controls the overall operation or a part of it in the information processing device 900 in accordance with various programs recorded in the ROM 903, the RAM 905, the storage device 919 or a removable recording medium 923. For example, the CPU 901 controls the overall operation of each functional unit included in the information processing device 20 according to the above embodiment. The ROM 903 stores programs and operation parameters used by the CPU 901. The RAM 905 temporarily stores program used in the execution of the CPU 901 and parameters that changes as appropriate in the execution. The CPU 901, ROM 903, and RAM 905 are connected to each other by the host bus 907 including an internal bus such as a CPU bus. In addition, the host bus 907 is connected to the external bus 911 such as a peripheral component interconnect/interface (PCI) bus via the bridge 909.

The input device 915 is, for example, a device operated by a user with a mouse, a keyboard, a touch panel, buttons, switches, a lever, and the like. The input device 915 may be, for example, a remote control unit using infrared light or other radio waves, or may be an external connection device 927 such as a portable phone operable in response to the operation of the information processing device 900. The input device 915 includes an input control circuit that generates an input signal on the basis of the information input by a user and outputs the input signal to the CPU 901. By operating the input device 915, a user can input various types of data to the information processing device 900 or issue instructions for causing the information processing device 900 to perform a processing operation.

The output device 917 includes a device capable of visually or audibly notifying a user of the acquired information. The output device 917 may be, for example, a display device such as an LCD, a PDP, and an OELD, an audio output device, such as a speaker or a headphone, and a printer. The output device 917 outputs the results obtained from the process of the information processing device 900 in a form of video such as text or an image and sound such as audio.

The storage device 919 is a device for data storage configured as an example of a storage unit of the information processing device 900. The storage device 919 includes, for example, a magnetic storage device such as a hard disk drive (HDD), a semiconductor storage device, an optical storage device, or a magneto-optical storage device. The storage device 919 stores programs to be executed by the CPU 901, various data, and data obtained from the outside.

The drive 921 is a reader/writer for the removable recording medium 923 such as a magnetic disk, an optical disk, a magneto-optical disk, or a semiconductor memory, and is embedded in the information processing device 900 or externally attached thereto. The drive 921 reads the information recorded in the attached removable recording medium 923 and outputs the information to the RAM 905. Further, the drive 921 writes record in the attached removable recording medium 923.

The connection port 925 is a port used to directly connect devices to the information processing device 900. The connection port 925 may be, for example, a universal serial bus (USB) port, an IEEE1394 port, a small computer system interface (SCSI) port, or the like. In addition, the connection port 925 may be an RS-232C port, an optical audio terminal, High-Definition Multimedia Interface (HDMI) (registered trademark) port, or the like. By connecting the external connection device 927 to the connection port 925, various data may be exchanged between the information processing device 900 and the external connection device 927.

The communication device 929 is, for example, a communication interface including a communication device or the like for connection to the communication network NW. The communication device 929 may be, for example, a communication card for a wired or wireless local area network (LAN), Bluetooth (registered trademark), wireless USB (WUSB), or the like. In addition, the communication device 929 may be a router for optical communication, a router for asymmetric digital subscriber line (ADSL), a modem for various kinds of communications, or the like. The communication device 929 transmits and receives signals to and from, for example, the Internet or other communication devices using a predetermined protocol such as TCP/IP. In addition, the communication network NW to be connected to the communication device 929 is a network connected in a wired or wireless manner, and is, for example, the Internet, a home LAN, infrared communication, radio wave communication, satellite communication, or the like.

The foregoing thus illustrates an exemplary hardware configuration of the information processing device 900.

6. Conclusion

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above-described embodiments, it is assumed that the anonymous information is the information regarding the skin of the user, but the present technology is not limited to this example. Specifically, the anonymous information may be biological information such as the health status, height, weight, body fat percentage, and genetic information of the user, or may be information that the user does not wish others to know, such as behavior history, positional information, and payment information.

In addition, in the above-described embodiments, the screen including the real name information acquired from the real name server and the anonymous information acquired from the anonymous server is generated by the screen generation unit, but the present technology is not limited to this example. Specifically, the screen generation unit may generate a screen including only the real name information acquired from the real name server, or may generate a screen including only the anonymous information acquired from the anonymous server.

In addition, in the above-described embodiments, the information processing device acquires the real name information from the real name server, and acquires the anonymous information from the anonymous server, but the present technology is not limited to this example. Specifically, in the case where the anonymous server generates information that is not confidential (referred to as "non-confidential information") on the basis of the anonymous information, the real name server may acquire non-confidential information that corresponds to the anonymous ID associated with the user ID via the mapping server, and transmit the real name information that is granted the non-confidential information to the information processing device. With this configuration, it is possible to acquire the non-confidential information based on the anonymous information by merely accessing the real name information stored in the real name server.

Note that each of the steps in the processing performed by the information processing device according to this specification do not necessarily need to be performed in the chronological order illustrated in the flowcharts. For example, each of the steps in the processing performed by the information processing device may be performed in an order different to that illustrated in the flowcharts, or may be performed in parallel.

In addition, a computer program may be created to cause the hardware, such as the CPU, the ROM and the RAM, that is built into the information processing device to perform functions equivalent to the functions of the respective configurations of the information processing device that includes, for example, the above-mentioned adjustment instruction specification unit. In addition, a storage medium having the above computer program stored thereon may also be provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a real name information acquisition unit configured to acquire real name information from a real name server that stores a user ID and personal information in association with the real name information;

an anonymous information acquisition unit configured to acquire anonymous information from an anonymous server that stores an anonymous ID in association with the anonymous information; and a screen generation unit configured to generate a display screen including the real name information and the anonymous information.

(2)

The information processing device according to (1), further including:

an authorization processing unit configured to perform processing of authorizing access to the real name information stored in the real name server and the anonymous information stored in the anonymous server by the real name information acquisition unit and the anonymous information acquisition unit, respectively, in which in a case where the authorization processing for accessing the real name information and the anonymous information performed by the authorization processing unit is complete, the real name information acquisition unit acquires the real name information, and the anonymous information acquisition unit acquires the anonymous information.

(3)

The information processing device according to (2), in which the authorization processing unit transmits an authorization request for accessing the real name information, and an authorization request for accessing the anonymous information to a mapping server configured to store the user ID and the anonymous ID in association with each other, the authorization processing unit completes the authorization processing for accessing the real name information and the anonymous information through acquiring, from the mapping server, real name information access authorization information and anonymous information access authorization information that correspond to the authorization request for accessing the real name information and the authorization request for accessing the anonymous information, respectively, in a case where the mapping server receives the authorization request for accessing the real name information from the authorization processing unit, the mapping server generates, on a basis of a result of user authentication, identification information for identifying the information processing device, and transmits the identification information along with the real name information access authorization information to the authorization processing unit, and in a case where the mapping server receives the identification information along with the authorization request for accessing the anonymous information from the authorization processing unit, the mapping server transmits the anonymous information access authorization information to the authorization processing unit on a basis of a result of authentication of the authorization request for accessing the anonymous information using the identification information.

(4)

The information processing device according to (3), in which the user authentication is carried out in an authentication server that is different to the mapping server.

(5)

The information processing device according to any one of (1) to (4), in which the anonymous information includes confidential information.

(6)

The information processing device according to (5), in which the confidential information includes biological information.

(7)

The information processing device according to (6), in which the biological information includes information related to skin.

(8)

An information processing method including:
  acquiring, by a processor, real name information from a real name server that stores a user ID and personal information in association with the real name information;
  acquiring, by the processor, anonymous information from an anonymous server that stores an anonymous ID in association with the anonymous information; and
  generating, by the processor, a display screen including the real name information and the anonymous information.

(9)

A program for causing a computer to function as:
  a real name information acquisition unit configured to acquire real name information from a real name server that stores a user ID and personal information in association with the real name information;
  an anonymous information acquisition unit configured to acquire anonymous information from an anonymous server that stores an anonymous ID in association with the anonymous information; and
  a screen generation unit configured to generate a display screen including the real name information and the anonymous information.

(10)

A mapping server including:
  a storage unit configured to store a user ID and an anonymous ID in association with each other;
  an information generation unit configured to generate identification information for identifying an external device on a basis of a result of user authentication in a case where the information generation unit receives, from the external device, an authorization request for accessing real name information stored in a real name server that stores the user ID and personal information in association with the real name information;
  a communication unit configured to transmit the identification information to the external device; and
  an authentication unit configured to perform, in a case where the authentication unit receives, from the external device, the identification information along with an authorization request for accessing anonymous information stored in an anonymous server that stores the anonymous ID in association with the anonymous information, authentication of the authorization request for accessing the anonymous information using the identification information received from the external device.

REFERENCE SIGNS LIST

10 imaging device
20 information processing device
30 real name server
40 anonymous server
50 mapping server
60 authentication server
200 communication unit
210 control unit
211 authorization processing unit
212 real name information acquisition unit
213 anonymous information acquisition unit
214 screen generation unit
220 storage unit
500 communication unit
510 control unit
511 information generation unit
512 authentication unit
520 storage unit

The invention claimed is:

1. An information processing device, comprising:
  a hardware processor configured to:
    transmit, to a mapping server, a first authorization request to access real name information;
    receive, from the mapping server, a first authorization code and identification information based on a result of user authentication;
    acquire the real name information from a real name server based on the first authorization code, wherein the real name server stores a user ID and personal information in association with the real name information;
    transmit, to the mapping server, a second authorization request and the identification information to access anonymous information;
    receive, from the mapping server, a second authorization code based on the identification information;
    acquire the anonymous information from an anonymous server based on the second authorization code, wherein the anonymous server stores an anonymous ID in association with the anonymous information; and
    generate a display screen including the real name information and the anonymous information.

2. The information processing device according to claim 1, wherein the hardware processor is further configured to:
  authorize access to the real name information stored in the real name server and the anonymous information stored in the anonymous server; and
  acquire the real name information and the anonymous information based on completion of the authorization.

3. The information processing device according to claim 2, wherein the hardware processor is further configured to:
  acquire, from the mapping server, real name information access authorization information corresponding to the first authorization request and anonymous information access authorization information corresponding to the second authorization request; and
  complete an authorization processing for to access the real name information and the anonymous information based on the real name information access authorization information and the anonymous information access authorization information, wherein
in a case where the mapping server receives the first authorization request from the hardware processor, the mapping server is configured to:
generate based on the result of the user authentication, the identification information to identify the information processing device; and
transmit the identification information along with the real name information access authorization information to the hardware processor, and
in a case where the mapping server receives the identification information along with the second authorization request from the hardware processor, the mapping server is configured to transmit the anonymous information access authorization information to the hardware processor based on a result of authentication of the second authorization request using the identification information.

4. The information processing device according to claim 3, wherein the user authentication is carried out in an authentication server that is different to the mapping server.

5. The information processing device according to claim 1, wherein the anonymous information includes confidential information.

6. The information processing device according to claim 5, wherein the confidential information includes biological information.

7. The information processing device according to claim 6, wherein the biological information includes information of skin.

8. An information processing method, comprising:
transmitting, by a processor to a mapping server, a first authorization request to access real name information;
receiving, by the processor from the mapping server, a first authorization code and identification information based on a result of user authentication;
acquiring, by the processor, the real name information from a real name server based on the first authorization code, wherein the real name server stores a user ID and personal information in association with the real name information;
transmitting, by the processor to the mapping server, a second authorization request and the identification information to access anonymous information;
receiving, by the processor from the mapping server, a second authorization code based on the identification information;
acquiring, by the processor, anonymous information from an anonymous server based on the second authorization code, wherein the anonymous server stores an anonymous ID in association with the anonymous information; and
generating, by the processor, a display screen including the real name information and the anonymous information.

9. A non-transitory computer-readable medium having stored thereon, computer-executable instructions, which when executed by a computer, cause the computer to execute operations, the operations comprising:
transmitting, to a mapping server, a first authorization request to access real name information;
receiving, from the mapping server, a first authorization code and identification information based on a result of user authentication;
acquiring the real name information from a real name server based on the first authorization code, wherein the real name server stores a user ID and personal information in association with the real name information;
transmitting, to the mapping server, a second authorization request and the identification information to access anonymous information;
receiving, from the mapping server, a second authorization code based on the identification information;
acquiring anonymous information from an anonymous server based on the second authorization code, wherein the anonymous server stores an anonymous ID in association with the anonymous information; and
generating a display screen including the real name information and the anonymous information.

10. A mapping server, comprising:
a hardware processor configured to:
control a storage device to store a user ID and an anonymous ID in association with each other;
receive, from an external device, a first authorization request to access real name information from a real name server, wherein the real name server stores the user ID and personal information in association with the real name information;
generate, based on a result of user authentication and the first authorization request, a first authorization code and identification information to identify an external device;
transmit the first authorization code and the identification information to the external device;
receive, from the external device, the identification information and a second authorization request to access anonymous information from an anonymous server, wherein the anonymous server stores the anonymous ID in association with the anonymous information; and
authenticate the second authorization request based on the identification information received from the external device.

* * * * *